6505X
D. SMITH.
CHURN.
Patented Apr. 21. 1831.
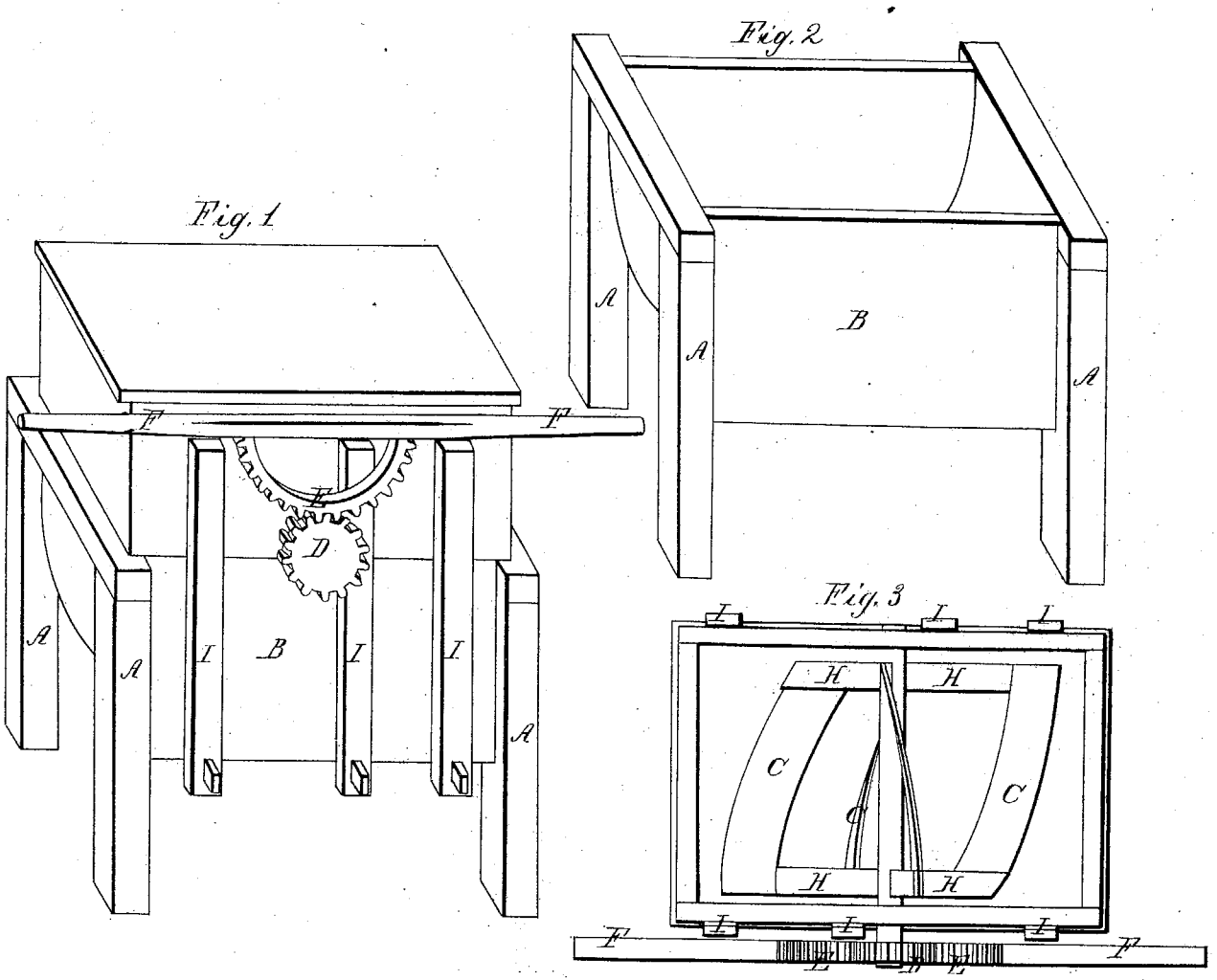
THE NORRIS PETERS CO., PHOTO-LITHO., WASHINGTON, D. C.

6505X

Apl. 21. 1831

David Smith a Citizen of,

Letters Patent,

The Schedule referred to in these Letters Patent and making part of the same, containing a description in the words of the said David Smith, himself of his improvement in the Churn.

Be it known that I David Smith, living near Emmetsburgh, Frederick County Maryland, have made an improvement in the Churn which is described as follows. This Churn consists of the following parts. 1 The frame. 2d. The trunk. 3d. The Dashers. 4th The Cog wheels and Lever. 1 The frame is made of any convenient size by mortising and tenoning together four legs with the side and end pieces and to be about 1 foot & 8 inches high. 2. The Trunk is also made of any convenient size, of a semicircular figure, made water tight, and has an opening & plug at the bottom to draw off the milk. It has a projection at the top to unite with the upper part to be hereafter described. 3. The Dashers are made in the usual mode but inclining obliquely and turn on an axle in the upper part of the churn, which is also made with a semicircular space; and shut down tight on the lower part by means of three arms on each side of the Churn, and which are keyed below the Churn by three bars passing through openings cut in them. 4. The Cog wheels & lever. A Cogwheel is fixed on the axle with the dashers, and a segment wheel attached to the middle of a lever, works in the cog wheel which works in the dashers. The top of the Churn forms a table and has a funnel in it, by which air or water may be introduced. Operation. The cream is 6505x Apl. 21, 1831 is put into the churn, the top is keyed down tight, one or two persons work the lever up and down which works the dashers till the butter comes, when it is gathered and taken out, the butter milk is drawn off at the plug. What I claim as my invention, is the construction of the above churn, particularly in the mode of keeping the top to the bottom, the inclined dashers and in the mode of working the dashers, by lever and cog wheels and segment. For a further illustration of my invention I refer to the model and drawing of the same deposited in the Patent Office.

In witness whereof I have hereunto subscribed my name before two Witnesses and made oath to the same this 15th day of April 1831.

Witnesses

Exd. Wm. O. Elliot

WC George Calvert

David Smith

[440 words]

(Granted April 21. 1831)